US008534264B2

(12) United States Patent
Kawaguchi et al.

(10) Patent No.: US 8,534,264 B2
(45) Date of Patent: Sep. 17, 2013

(54) ENGINE CONTROL APPARATUS

(75) Inventors: Tadashi Kawaguchi, Hiratsuka (JP); Jun Morinaga, Hiratsuka (JP); Hiroaki Inoue, Hiratsuka (JP)

(73) Assignee: Komatsu Ltd., Tokyo (JP)

( * ) Notice: Subject to any disclaimer, the term of this patent is extended or adjusted under 35 U.S.C. 154(b) by 643 days.

(21) Appl. No.: 12/733,726

(22) PCT Filed: Sep. 11, 2008

(86) PCT No.: PCT/JP2008/066433

§ 371 (c)(1), (2), (4) Date: Mar. 17, 2010

(87) PCT Pub. No.: WO2009/038016

PCT Pub. Date: Mar. 26, 2009

(65) Prior Publication Data

US 2010/0186713 A1 Jul. 29, 2010

(30) Foreign Application Priority Data

Sep. 19, 2007 (JP) ................................ 2007-243102

(51) Int. Cl.
*F02D 29/04* (2006.01)
*F02D 29/06* (2006.01)

(52) U.S. Cl.
USPC ............................................ 123/350; 701/50

(58) Field of Classification Search
USPC .................. 701/50; 123/349, 350, 351, 364, 123/365, 367, 198 C; 60/701, 702; 322/14, 322/15, 16, 40; 903/905, 906
See application file for complete search history.

(56) References Cited

U.S. PATENT DOCUMENTS 4,955,344 A * 9/1990 Tatsumi et al. ............... 123/352
5,307,631 A * 5/1994 Tatsumi et al. ................. 60/452

(Continued)

FOREIGN PATENT DOCUMENTS

CN 1989325 A 6/2007
CN 200580025758 7/2007

(Continued)

OTHER PUBLICATIONS

Office Action mailed Aug. 7, 2012, issued for the corresponding Japanese Patent Application No. 2007-243102.

(Continued)

*Primary Examiner* — Stephen K Cronin
*Assistant Examiner* — Arnold Castro
(74) *Attorney, Agent, or Firm* — Edwards Wildman Palmer LLP

(57) ABSTRACT

An engine control apparatus includes an engine target speed set unit 51 setting a first target speed through a throttle dial, a relief engine maximum speed calculation unit 52 calculating a second target speed limiting a maximum target speed in a relief operation according to a load pressure of a hydraulic pump, a speed control means controlling an engine speed such that the engine speed is equal to lower one of the first target speed and the second target speed, a determination means determining whether an engine torque assist action of a generator motor is performed, based on a deviation between an target speed and a real speed of the engine. When the determination means determines that the engine torque assist action is performed, the speed control means controls the engine speed to be equal to the target speed through the engine torque assist action of the generator motor.

3 Claims, 8 Drawing Sheets

(56) References Cited

U.S. PATENT DOCUMENTS

| | | | | |
|---|---|---|---|---|
| 5,638,677 | A * | 6/1997 | Hosono et al. | 60/431 |
| 6,020,651 | A | 2/2000 | Nakamura et al. | |
| 6,127,813 | A * | 10/2000 | Tamagawa | 322/16 |
| 6,349,252 | B1 * | 2/2002 | Imanishi et al. | 701/50 |
| 6,565,473 | B2 * | 5/2003 | Endo et al. | 475/117 |
| 6,666,022 | B1 * | 12/2003 | Yoshimatsu et al. | 60/413 |
| 6,708,787 | B2 * | 3/2004 | Naruse et al. | 180/53.8 |
| 6,820,356 | B2 * | 11/2004 | Naruse et al. | 37/348 |
| 6,937,931 | B2 * | 8/2005 | Funato et al. | 701/54 |
| 7,565,801 | B2 * | 7/2009 | Tozawa et al. | 60/414 |
| 7,584,611 | B2 | 9/2009 | Ariga et al. | |
| 7,637,843 | B2 * | 12/2009 | Yamaguchi | 477/44 |
| 7,669,413 | B2 * | 3/2010 | Komiyama et al. | 60/414 |
| 8,006,491 | B2 * | 8/2011 | Narazaki et al. | 60/452 |
| 8,136,271 | B2 * | 3/2012 | Sakai et al. | 37/348 |
| 8,214,110 | B2 * | 7/2012 | Morinaga et al. | 701/50 |
| 2002/0094910 | A1 * | 7/2002 | Endo et al. | 477/97 |
| 2004/0251064 | A1 * | 12/2004 | Imai | 180/65.2 |
| 2006/0260877 | A1 * | 11/2006 | Ito et al. | 187/224 |
| 2008/0072588 | A1 | 3/2008 | Ariga et al. | |
| 2008/0245065 | A1 * | 10/2008 | Nakamura et al. | 60/426 |
| 2009/0137199 | A1 * | 5/2009 | Jeung | 454/230 |
| 2009/0163318 | A1 * | 6/2009 | Matsuyama | 477/68 |
| 2009/0238696 | A1 * | 9/2009 | Satake et al. | 417/34 |
| 2009/0320461 | A1 * | 12/2009 | Morinaga et al. | 60/431 |
| 2010/0042301 | A1 * | 2/2010 | Shimizu et al. | 701/58 |
| 2011/0167811 | A1 * | 7/2011 | Kawaguchi et al. | 60/395 |

FOREIGN PATENT DOCUMENTS

| | | | |
|---|---|---|---|
| JP | 03-267534 | A | 11/1991 |
| JP | 11-002144 | A | 1/1999 |
| JP | 2003-028071 | A | 1/2003 |
| JP | 2005-090354 | A | 4/2005 |
| JP | 2006-144705 | A | 6/2006 |

OTHER PUBLICATIONS

International Search Report dated Nov. 18, 2008, issued on PCT/JP2008/066433.

* cited by examiner

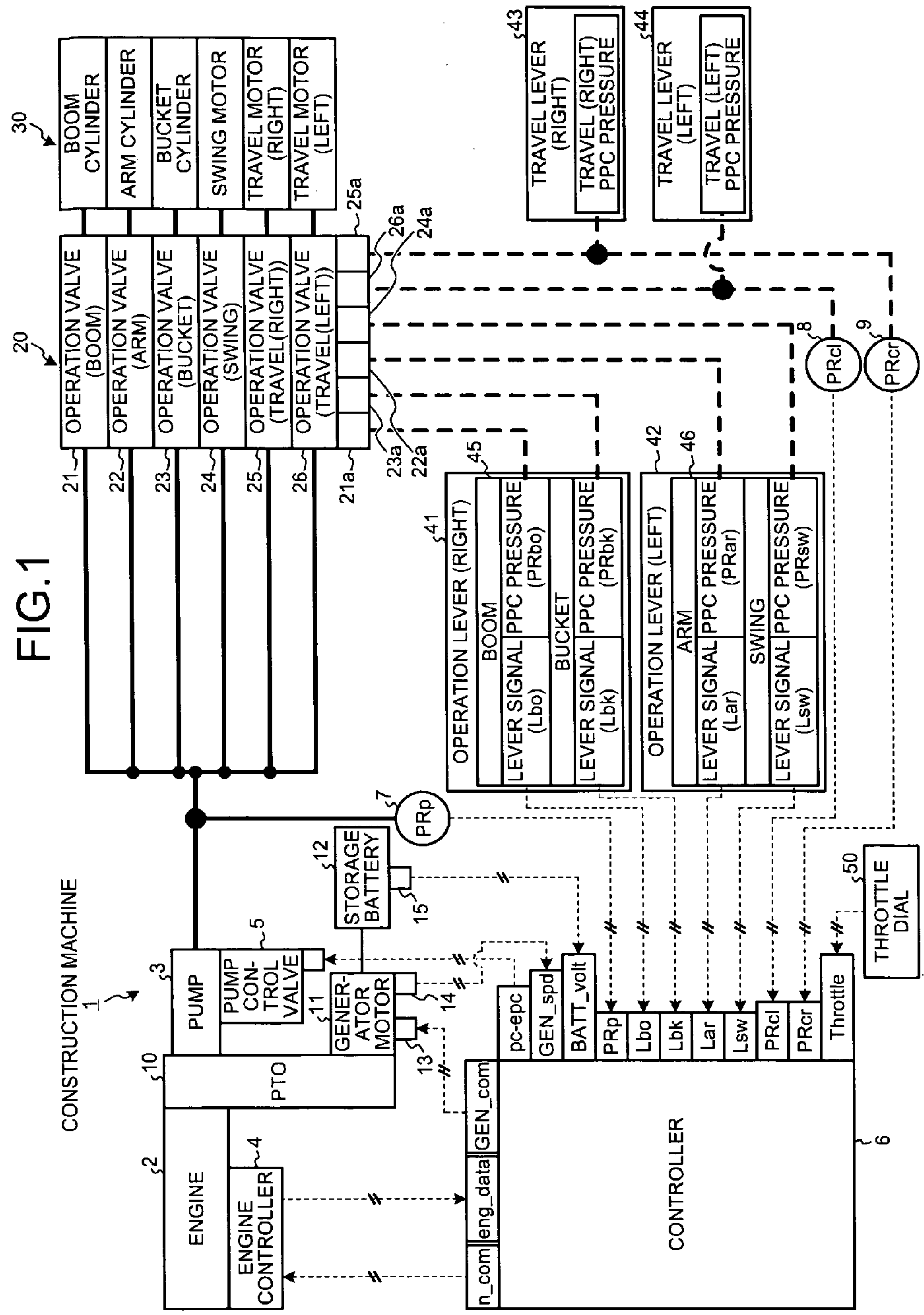
FIG.1
CONSTRUCTION MACHINE
1
ENGINE
2
ENGINE CONTROLLER
4
PTO
10
PUMP
3
PUMP CONTROL VALVE
5
GENERATOR MOTOR
11
13
14
STORAGE BATTERY
12
15
PRp
7
OPERATION VALVE (BOOM)
OPERATION VALVE (ARM)
OPERATION VALVE (BUCKET)
OPERATION VALVE (SWING)
OPERATION VALVE (TRAVEL(RIGHT))
OPERATION VALVE (TRAVEL(LEFT))
20
21
22
23
24
25
26
21a
22a
23a
24a
25a
26a
BOOM CYLINDER
ARM CYLINDER
BUCKET CYLINDER
SWING MOTOR
TRAVEL MOTOR (RIGHT)
TRAVEL MOTOR (LEFT)
30
TRAVEL LEVER (RIGHT)
TRAVEL (RIGHT) PPC PRESSURE
43
TRAVEL LEVER (LEFT)
TRAVEL (LEFT) PPC PRESSURE
44
PRcl
8
PRcr
9
OPERATION LEVER (RIGHT)
41
BOOM
LEVER SIGNAL (Lbo)
PPC PRESSURE (PRbo)
BUCKET
LEVER SIGNAL (Lbk)
PPC PRESSURE (PRbk)
45
OPERATION LEVER (LEFT)
42
ARM
LEVER SIGNAL (Lar)
PPC PRESSURE (PRar)
SWING
LEVER SIGNAL (Lsw)
PPC PRESSURE (PRsw)
46
THROTTLE DIAL
50
CONTROLLER
6
n_com
eng_data
GEN_com
pc-epc
GEN_spd
BATT_volt
PRp
Lbo
Lbk
Lar
Lsw
PRcl
PRcr
Throttle THROTTLE
ENGINE THROTTLE
PRp
MAIN PUMP PRESSURE
51
ENGINE SPEED SET UNIT
51a
EngSpdCom
Throttle
52
ENGINE MAXIMUM SPEED CALCULATION UNIT IN RELIEF OPERATION
52a
EngMaxSpd
PRp
53
MIN
n_com
ENGINE TARGET SPEED

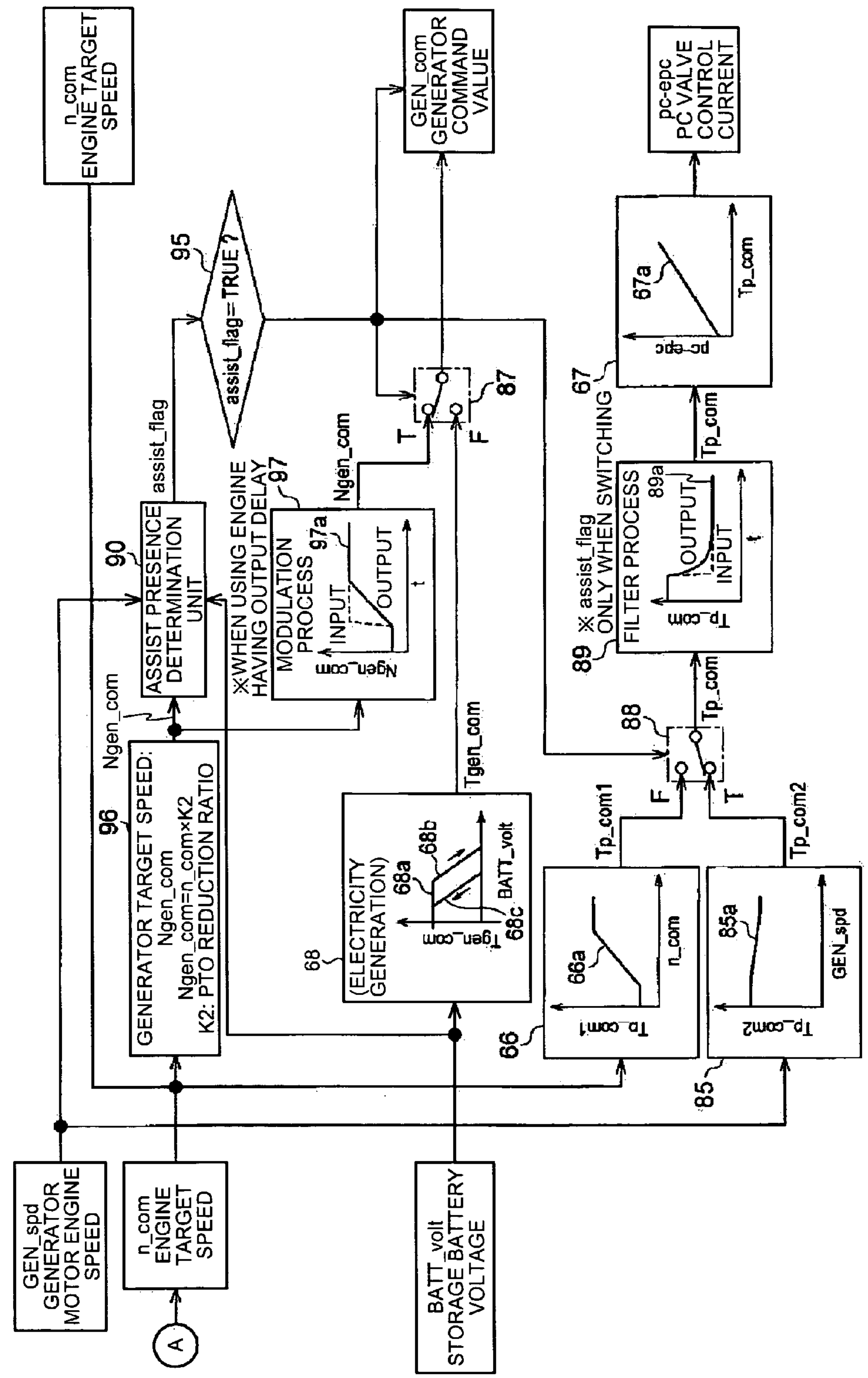
FIG.3
n_com
ENGINE TARGET SPEED
GEN_com
GENERATOR COMMAND VALUE
pc-epc
PC VALVE CONTROL CURRENT
95
assist_flag=TRUE ?
assist_flag
90
ASSIST PRESENCE DETERMINATION UNIT
※WHEN USING ENGINE HAVING OUTPUT DELAY
97
Ngen_com
MODULATION PROCESS
97a
INPUT
OUTPUT
t
T
F
87
67
67a
Tp_com
89
※ assist_flag ONLY WHEN SWITCHING
FILTER PROCESS
89a
Ngen_com
96
GENERATOR TARGET SPEED: Ngen_com
Ngen_com=n_com×K2
K2: PTO REDUCTION RATIO
Tgen_com
68
(ELECTRICITY GENERATION)
68a
68b
68c
BATT_volt
88
Tp_com1
Tp_com2
66
66a
n_com
85
85a
GEN_spd
GEN_spd
GENERATOR MOTOR ENGINE SPEED
n_com
ENGINE TARGET SPEED
A
BATT_volt
STORAGE BATTERY VOLTAGE

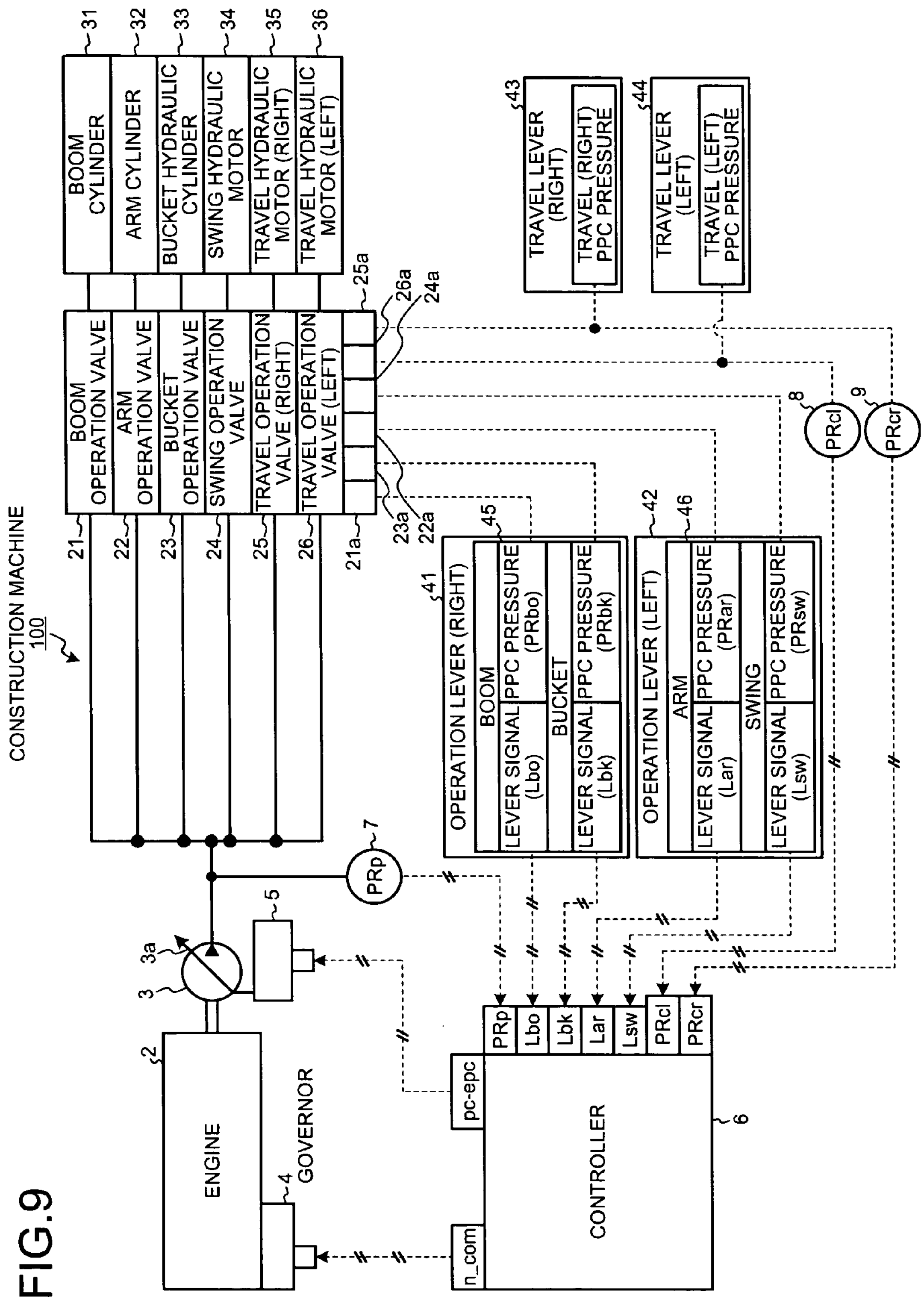
FIG.9
CONSTRUCTION MACHINE
100
BOOM CYLINDER
ARM CYLINDER
BUCKET HYDRAULIC CYLINDER
SWING HYDRAULIC MOTOR
TRAVEL HYDRAULIC MOTOR (RIGHT)
TRAVEL HYDRAULIC MOTOR (LEFT)
BOOM OPERATION VALVE
ARM OPERATION VALVE
BUCKET OPERATION VALVE
SWING OPERATION VALVE
TRAVEL OPERATION VALVE (RIGHT)
TRAVEL OPERATION VALVE (LEFT)
TRAVEL LEVER (RIGHT)
TRAVEL (RIGHT) PPC PRESSURE
TRAVEL LEVER (LEFT)
TRAVEL (LEFT) PPC PRESSURE
OPERATION LEVER (RIGHT)
BOOM
LEVER SIGNAL (Lbo)
PPC PRESSURE (PRbo)
BUCKET
LEVER SIGNAL (Lbk)
PPC PRESSURE (PRbk)
OPERATION LEVER (LEFT)
ARM
LEVER SIGNAL (Lar)
PPC PRESSURE (PRar)
SWING
LEVER SIGNAL (Lsw)
PPC PRESSURE (PRsw)
PRp
PRcl
PRcr
ENGINE
GOVERNOR
CONTROLLER
pc-epc
n_com
PRp
Lbo
Lbk
Lar
Lsw
PRcl
PRcr
2
3
3a
4
5
6
7
8
9
21
22
23
24
25
26
21a
22a
23a
24a
25a
26a
31
32
33
34
35
36
41
42
43
44
45
46

ENGINE CONTROL APPARATUS

TECHNICAL FIELD

The present invention relates to an engine control apparatus configured to drive a hydraulic pump through an engine.

BACKGROUND ART

In the related art, diesel engines are installed on construction machines including hydraulic shovels, bulldozers, dump trucks, and wheel loaders.

FIG. 9 illustrates a configuration of a conventional construction machine 100. Referring to FIG. 9, the construction machine 100 uses an engine 2, which is a diesel engine, as a driving source to drive a hydraulic pump 3. A capacity variable type hydraulic pump is used as the hydraulic pump 3, and a tilt angle of an inclined plate 3*a* of the hydraulic pump 3 is varied to change a capacity q (cc/rev). Pressure oil discharged at a discharge pressure PRP and a flow rate Q (cc/min) from the hydraulic pump 3 are supplied to hydraulic actuators 31, 32, 33, 34, 35, and 36 including a boom cylinder 31 through operation valves 21, 22, 23, 24, 25, and 26. The operation valves 21, 22, 23, 24, 25, and 26 are operated by operating operation levers and 42. Pressure oil is supplied to each of the hydraulic actuators 31, 32, 33, 34, 35, and 36 to be driven, and then, a work device including a boom, an arm, and a bucket connected to the hydraulic actuators 31, 32, 33, 34, 35, and 36, a lower travel body, and an upper swing body are operated. While the construction machine 100 is operated, loads applied to the work device, the lower travel body, and the upper swing body is continually varied according to the quality of earth to be excavated, the slope of travel path. Accordingly, a load of the hydraulic device (the hydraulic pump 3), that is, a load applied to the engine 2 is varied.

An output P (horsepower; kw) of the engine 2 is controlled by adjusting a fuel amount injected into the cylinder. The adjusting of the fuel amount is performed by controlling a governor 4 provided to a fuel injection pump of the engine 1. An all speed control type governor is generally used as the governor 4. An engine speed n and a fuel injection amount (torque T) are adjusted according to a load to maintain a target engine speed set with a fuel dial. That is, the governor 4 increases or decreases the fuel injection amount such that the target speed is equal to the engine speed.

FIG. 10 is a torque graph of the engine 2 with a horizontal axis being the engine speed n (rpm; rev/min) and a vertical axis being the torque T (N·m). Referring to FIG. 10, a region defined as a maximum torque line R denotes the performance of the engine 2. The governor 4 controls the engine 2 to prevent the torque T from reaching an exhaust gas limit over the maximum torque line R, and prevent the engine speed n from reaching over rotation over a high idle speed nH. The output (horsepower) P of the engine 2 is maximal at a rated point V on the maximum torque line R. Along an iso horsepower curve J, horsepower absorbed at the hydraulic pump 3 is disposed.

When the maximum target speed is set with the fuel dial, the governor 4 adjusts speed on a maximum speed regulation line Fe connecting the rated point V to a high idle point nH.

As the load of the hydraulic pump 3 is increased, a matching point where the output of the engine 2 and a pump absorption horsepower are in equilibrium moves to the rated point V on the maximum speed regulation line Fe. When the matching point moves to the rated point V, the engine speed n is slowly decreased. The engine speed n is a rated speed at the rated point V.

As such, in the state the engine speed n is fixed at a substantially constant high speed, when a work is performed, fuel consumption rate is increased (deteriorate), and pump efficiency is decreased. The fuel consumption rate (hereinafter, fuel efficiency) means a fuel consumption amount per hour and output of 1 kw, which is an index indicating the efficiency the engine 2. In addition, the pump efficiency is an efficiency of the hydraulic pump 3 defined as volume efficiency and torque efficiency.

Referring to FIG. 10, an iso fuel efficiency curve M has a trough M1 where the fuel efficiency is minimal. The fuel efficiency is increased from the minimum fuel efficiency point M1 to the outside.

As illustrated in FIG. 10, the regulation line Fe corresponds to a region where the fuel efficiency is relatively large on the iso fuel efficiency curve M. Thus, according to a conventional control method, the fuel efficiency and the engine efficiency are poor.

In the case of the capacity variable type hydraulic pump 3, when the discharge pressure PRP is constant, as the pump capacity q (the tilt angle of the inclined plate) is increased, the volume efficiency and the torque efficiency are increased, so that the pump efficiency is high.

Referring to Formula 1, in the state where the flow rate Q of pressure oil discharged from the hydraulic pump 3 is constant, when the speed n of the engine 2 is decreased, the pump capacity q can be increased. Thus, when the speed of the engine 2 is decreased, the pump efficiency can be increased.

$$Q=n\cdot q \quad (1)$$

Thus, to increase the efficiency of the hydraulic pump 3, the engine 2 is operated in a low speed region where the speed n of the engine 2 is small.

However, as illustrated in FIG. 10, the regulation line Fe corresponds to the high speed region of the engine 2. Thus, according to a conventional control method, the pump efficiency is low.

In addition, when the engine 2 is operated on the regulation line Fe, the engine speed is decreased at a high load state. Thus, engine stop may occur.

A control method of substantially fixing an engine speed regardless of the load is described above. On the other hand, a control method in which an engine speed is varied according to a lever operation amount and a load is disclosed in Patent Document 1.

In Patent Document 1, as illustrated in FIG. 10, an target engine driving line L0 passing through a fuel efficiency minimum point M1 is set.

In addition, a necessary speed of the hydraulic pump 3 is calculated based on operation amounts of the operation levers 41, 42, 43, and 44, and a first engine necessary speed corresponding to the necessary speed of the hydraulic pump 3 is calculated. Furthermore, an engine necessary horsepower is calculated based on operation amounts of the operation levers 41, 42, 43, and 44, and a second engine necessary speed corresponding to the engine necessary horsepower is calculated. In this case, the second engine necessary speed is calculated as the engine speed on the target engine driving line L0 of FIG. 10. The engine speed and the engine torque are controlled to obtain the greater one of the first and second engine necessary speeds.

As illustrated in FIG. 10, when the speed of the engine 2 is controlled along the target engine driving line L0, fuel efficiency, engine efficiency, and pump efficiency are improved. This is because, even when an identical horsepower is output to obtain an identical required flow rate, matching with a point pt2 on the iso horsepower line J and the target engine driving line L0 is adapted for a move from a high speed and a lower torque to a low speed and a high torque for increasing the pump capacity q and a driving to the fuel efficiency minimum point M1 on the iso fuel efficiency M, relative to matching with a point pt1 on the regulation line Fe. In addition, since the engine 2 is driven in a low rotation region, noises, engine friction, and pump unload loss are reduced.

In addition, in the construction machine field, as construction machines using a hybrid manner in which the driving force of an engine is assisted by a generator motor are developed, many patents have been applied.

For example, in Patent Document 2, as illustrated in FIG. 10, the engine 2 is controlled along a regulation line Fe0 corresponding to a set speed set with the fuel dial. An target speed nr corresponding to a point A where the regulation line Fe0 crosses the target engine driving line L0 is determined. When a deviation between the engine target speed nr and the current engine speed n is plus, a generator motor performs electrical motor action to assist the driving force of the engine 2 using torque generated from the generator motor. When the deviation is minus, the generator motor performs generation action to generate electricity to store power in a storage battery.

[Patent Document 1] Japanese Patent Application Laid-Open (JP-A) No. 11-2144

[Patent Document 2] Japanese Patent Application Laid-Open (JP-A) No. 2003-28071

DISCLOSURE OF INVENTION

Problem to be Solved by the Invention

In the invention in Patent Document 2, the engine 2 is controlled along the regulation line Fe0 corresponding to a set speed set with the fuel dial. In this control process, when the work device is in a high load state, for example, in contact with a hard rock, the pump pressure is quickly increased, and a relief valve is operated, so as to cause an additional energy loss. Thus, in the related art, an inclined plate of a hydraulic pump is controlled to vary a pump capacity, thereby decreasing a relief flow rate.

However, when the pump capacity is decreased to reduce the relief flow rate, the pump efficiency is decreased. Furthermore, in this case, since an engine speed is greater than an optimal engine speed, the engine efficiency is degraded.

To address these limitations, the invention provides an engine control apparatus capable of improving pump efficiency and engine efficiency at a high load state such as a relief operation.

Means for Solving Problem

According to an aspect of the present invention, an engine control apparatus includes: a hydraulic pump driven by an engine; a hydraulic actuator to which pressure oil discharged from the hydraulic pump is supplied; an operation unit configured to operate the hydraulic actuator; a first target speed set unit configured to set a first target speed of the engine by an engine target speed set dial; a second target speed calculation unit configured to calculate a second target speed limiting a maximum target speed of the engine according to increase of a load pressure of the hydraulic pump; and a speed control unit configured to control an engine speed such that the engine speed is equal to the lower one of the first target speed and the second target speed.

Advantageously, the engine control apparatus further includes: a generator motor connected to an output shaft of the engine; a storage battery configured to store electric power the generator motor generates, and to supply electric power to the generator motor; and a control unit. When the load pressure of the hydraulic pump is abruptly switched from a high state to a low state, until a real speed of the engine is increased to be equal to or greater than a value preset with respect to the target speed, the control unit uses an engine torque assist action of the generator motor to control the engine speed to be equal to the target speed.

Advantageously, the engine control apparatus further includes: a generator motor connected to an output shaft of the engine; a storage battery configured to store electric power the generator motor generates, and to supply electric power to the generator motor; and a control unit. By increase of the second target speed according to a case where the load pressure of the hydraulic pump is decreased from a high state to a low state, when a real speed of the engine is less than a preset value and the target speed, until the real speed is increased to be equal to or greater than a value less than the preset value and the target, speed, the control unit uses an engine torque assist action of the generator motor to control the engine speed to be equal to the target speed.

Effect of the Invention

In an engine control apparatus according to an embodiment of the invention, a first target speed of an engine is set by a first target speed set means with an engine speed set dial, a second target speed calculation means calculates a second target speed controlling the maximum target speed of the engine according to the increase of a load pressure of a hydraulic pump, and a speed control means controls and decreases the engine speed such that the engine speed is equal to lower any one of the first and second target speeds. Thus, pump efficiency and engine efficiency at a high load state such as a relief operation can be improved.

BRIEF DESCRIPTION OF DRAWINGS

FIG. 1 is a block diagram illustrating a configuration of a construction machine according to an embodiment of the invention.

FIG. 3 is a view illustrating the control flow of the controller of FIG. 1 (a second part of the control flow).

FIG. 9 is a block diagram illustrating a configuration of a related art construction machine.

EXPLANATIONS OF LETTERS OR NUMERALS

1: CONSTRUCTION MACHINE

2: ENGINE

Figure 2:
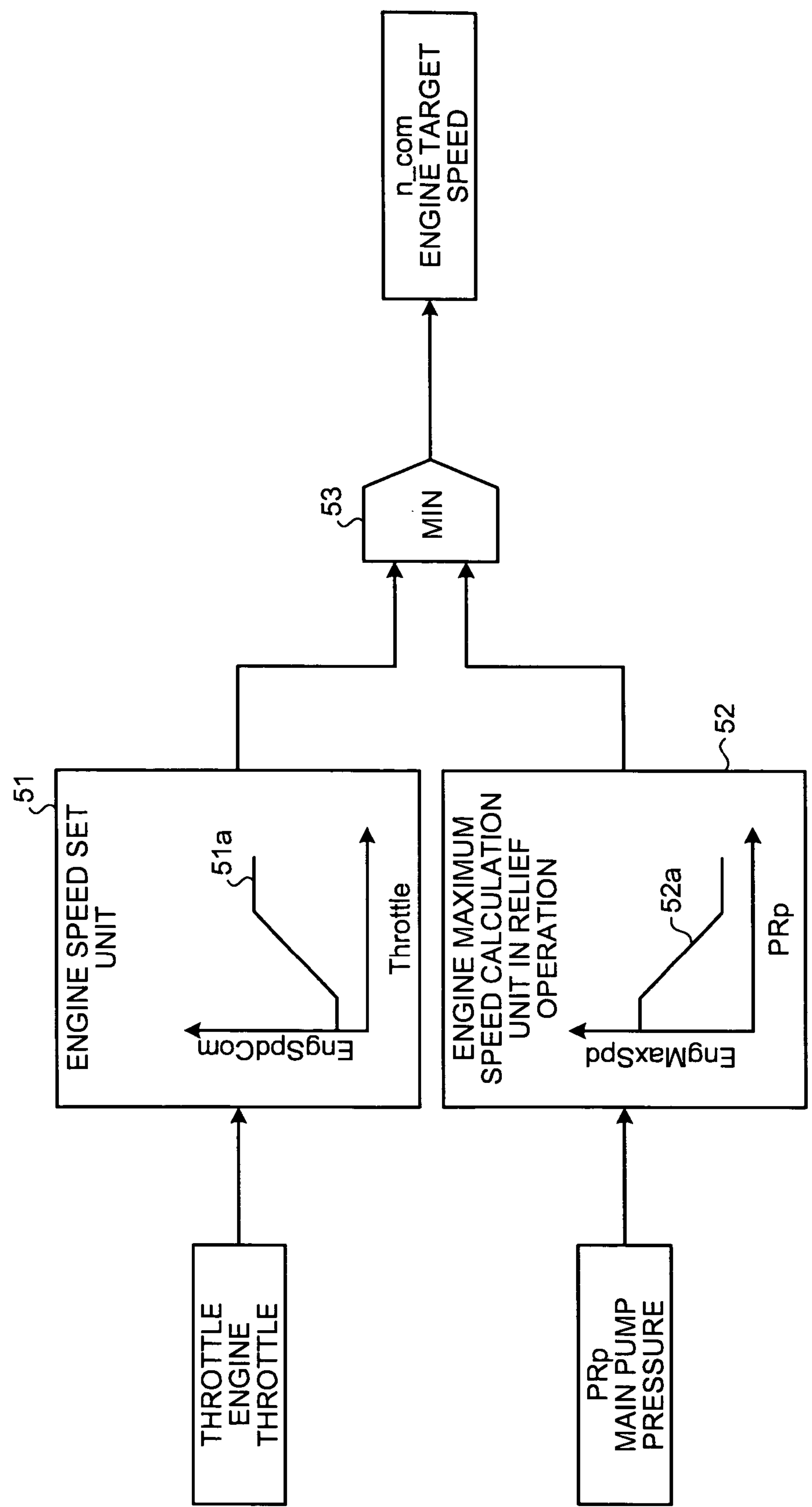
FIG. 2 is a view chart illustrating a control flow of a controller of FIG. 1 (a first part of the control flow).

3: HYDRAULIC PUMP
4: ENGINE CONTROLLER
5: PUMP CONTROL VALVE
6: CONTROLLER
7-9: HYDRAULIC SENSOR
10: PTO SHAFT
11: GENERATOR MOTOR
12: STORAGE BATTERY
31-36: HYDRAULIC ACTUATOR
41, 42: OPERATION LEVER
43, 44: TRAVEL LEVER
51: ENGINE SPEED SET UNIT
52: ENGINE MAXIMUM SPEED CALCULATION UNIT IN RELIEF OPERATION
53: MINIMUM SELECTION UNIT

BEST MODE(S) FOR CARRYING OUT THE INVENTION

Hereinafter, an engine control apparatus according to an embodiment of the invention will now be described with reference to the accompanying drawings. In the embodiment, cases of controlling a diesel engine and a hydraulic pump installed on a construction machine such as a hydraulic shovel will be described.

FIG. 1 is a schematic view illustrating an entire structure of a construction machine 1 according to an embodiment of the invention. The construction machine 1 is a hydraulic shovel.

The construction machine 1 includes an upper swing body and a lower travel body that includes endless tracks on its left and right sides. To a machine body, a working device including a boom, an arm, and a bucket is coupled. A boom cylinder 31 is driven to operate the boom. An arm cylinder 32 is driven to operate the arm. A bucket cylinder 33 is driven to operate the bucket. Travel motors 36 and 35 are respectively driven to operate the left endless track and the right endless track. In addition, a swing motor 34 is driven to operate a swing machine. The upper swing body is rotated through a swing pinion and a swing circle.

An engine 2 is a diesel engine. The amount of fuel injected into the cylinder is adjusted to control an output (horsepower; kw) of the engine 2. This adjustment is performed by controlling a governor provided to a fuel injection pump of the engine 2. An engine controller 4 controls the engine as well as the governor.

A throttle dial 50 is a dial configured to set an target speed of the engine 2 for a controller 6, and outputs a signal 'Throttle' indicating the target speed to the controller 6.

A rotation command value for setting an engine speed as a target speed n_com is output for the engine controller 4 by the controller 6. The engine controller 4 increases or decreases a fuel injection amount to obtain the target speed n_com. In addition, the engine controller 4 outputs an engine data eng_data related with the engine 2 to the controller 6.

An output shaft of the engine 2 is connected to a driving shaft of a generator motor 11 through a PT0 shaft 10. The generator motor 11 performs generation action and electrical motor action. That is, the generator motor 11 operates as an electric motor (a motor), and functions as an electric generator. In addition, the generator motor 11 functions as a starter configured to start the engine 2. When a starter switch is turned on, the generator motor 11 performs electrical motor action, and the output shaft of the engine 2 is rotated at a small speed (for example, a range from 400 rpm to 500 rpm), so as to start the engine 2.

The torque of the generator motor 11 is controlled by an inverter 13. The inverter 13, which will be described later, controls the torque of the generator motor 11 according to a generator motor command value GEN_com output from the controller 6.

The inverter 13 is electrically connected to the storage battery 12 through a direct current power line. In addition, the controller 6 operates using a storage battery 12 as a power source.

The storage battery 12 is configured by a capacitor or a storage cell. When the generator motor 11 performs generation action, the storage battery 12 stores the electricity (charge). In addition, the storage battery 12 supplies the electricity stored in the storage battery 12 to the inverter 13. According to embodiments of the invention, storage cell such as a lithium ion storage battery, a nickel hydrogen storage battery, a lead storage battery or a capacitor storing electric power as static electricity is referred to as a storage battery.

The output shaft of the engine 2 is connected to a driving shaft of a hydraulic pump 3 through the PTO shaft 10. As the output shaft of the engine is rotated, the hydraulic pump 3 is driven. The hydraulic pump 3 is a variable capacity type hydraulic pump. In this case, as a tilt angle of an inclined plate is varied, a capacity q (cc/rev) is varied.

Pressure oil discharged at a discharge pressure $PR_p$ and a flow rate Q (cc/min) from the hydraulic pump 3 is supplied to a boom operation valve 21, an arm operation valve 22, a bucket operation valve 23, a swing operation valve 24, a right travel operation valve 25, and a left travel operation valve 26. The pump discharge pressure PRp is detected by the hydraulic sensor 7 and hydraulic detection signal is input to the controller 6.

The pressure oil output from the operation valve 21 is supplied to the boom cylinder 31. The pressure oil output from the operation valve 22 is supplied to the arm cylinder 32. The pressure oil output from the operation valve 23 is supplied to the bucket cylinder 33. The pressure oil output from the operation valve 24 is supplied to the swing motor 34. The pressure oil output from the operation valve 25 is supplied to the right travel motor 35. The pressure oil output from the operation valve 26 is supplied to the left travel motor 36. Accordingly, the boom cylinder 31, the arm cylinder 32, the bucket cylinder 33, the swing motor 34, the right travel motor 35, and the left travel motor 36 are driven to respectively operate the boom, the arm, the bucket, the upper swing body, and the right endless track and the left endless track of a lower travel body.

A work swing right operation lever 41 and a travel right operation lever 43 are installed on the right front side of a driver's seat of the construction machine 1. A work swing left operation lever 42 and a travel left operation lever 44 are installed on the left front side of the driver's seat of the construction machine 1.

The work swing right operation lever 41 is an operation lever configured to operate the boom and the bucket, which operates the boom and the bucket according to an operation direction and operates the boom and the bucket at a speed according to an operation amount.

A sensor 45 configured to detect an operation direction and an operation amount is installed at the operation lever 41. The sensor 45 inputs a lever signal, indicating an operation direction and an operation amount of the operation lever 41, to the controller 6. When the operation lever 41 is operated in a direction in which the boom is operated, a boom lever signal LbO, indicating a boom ascent operation amount and a boom descent operation amount according to a tilt direction and a tilt amount with respect to a neutral position of the operation lever 41, is input to the controller 6. In addition, when the operation lever 41 is operated in a direction in which the bucket is operated, a bucket lever signal Lbk, indicating a boom excavation operation amount and a boom dump operation amount according to a tilt direction and a tilt amount with respect to the neutral position of the w operation lever 41, is input to the controller 6.

When the operation lever 41 is operated in a direction in which the boom is operated, a pilot pressure (PPC pressure) PRbo according to a tilt amount of the operation lever 41 is added to one 21*a* of pilot ports of the boom operation valve 21 corresponding to a lever tilt direction (a boom ascent direction or a boom descent direction).

In a same manner, when the operation lever 41 is operated in a direction in which the bucket is operated, a pilot pressure (PPC pressure) PRbk according to a tilt amount of the operation lever 41 is added to one 23*a* of pilot ports of the bucket operation valve 23 corresponding to a lever tilt direction (a bucket excavation direction or a bucket dump direction).

The work swing left operation lever 42 is an operation lever configured to operate the arm and the upper swing body, which operates the arm and the upper swing body according to an operation direction and operates the arm and the upper swing body at a speed according to an operation amount.

A sensor 46 configured to detect an operation direction and an operation amount is installed at the operation lever 42. The sensor 46 inputs a lever signal, indicating an operation direction and an operation amount of the operation lever 42, to the controller 6. When the operation lever 42 is operated in a direction in which the arm is operated, an arm lever signal Lar indicating an arm excavation operation amount and an arm dump operation amount is input to the controller 6 according to a tilt direction and a tilt amount with respect to a neutral position of the operation lever 42. In addition, when the operation lever 42 is operated in a direction in which the upper swing body is operated, a swing lever signal Lsw, indicating a right swing operation amount and a left swing operation amount is input to the controller 6 according to a tilt direction and a tilt amount with respect to the neutral position of the operation lever 42.

When the operation lever 42 is operated in a direction in which the arm is operated, a pilot pressure (PPC pressure) PRar according to a tilt amount of the operation lever 42 is added to one 22*a* of pilot ports of the arm operation valve 22 corresponding to a lever tilt direction (an arm excavation direction or an arm dump direction).

In a same manner, when the operation lever 42 is operated in a direction in which the upper swing body is operated, a pilot pressure (PPC pressure) PRsw according to a tilt amount of the operation lever 42 is added to one 24*a* of pilot ports of the swing operation valve 24 corresponding to a lever tilt direction (a right swing direction or a left swing direction).

The travel right operation lever 43 and the travel left operation lever 44 are operation levers configured to respectively operate the right endless track and the left endless track, and operate the endless tracks according to operation directions and operate the endless tracks at speeds according to operation amounts.

A pilot pressure (PPC pressure) PRtr according to a tilt amount of the operation lever 43 is added to a pilot port 25*a* of the right travel operation valve 25.

The pilot pressure PRtr is detected by a hydraulic sensor 9, and a right travel pilot pressure PRcr indicating a right travel amount is input to the controller 6. In a same manner, a pilot pressure (PPC pressure) PRtl according to a tilt amount of the operation lever 44 is added to a pilot port 26*a* of the left travel operation valve 26. The pilot pressure PRtl is detected by a hydraulic sensor 8, and a left travel pilot pressure PRcl indicating a left travel amount is input to the controller 6.

The operation valves 21, 22, 23, 24, 25, and 26 are flow rate direction control valves which move spools in directions according to operation directions of the corresponding operation levers 41, 42, 43, and 44, and move the spools to open conduits by opening areas according to operation amounts of the operation levers 41, 42, 43, and 44.

A pump control valve 5 is operated by a control current pc-epc output from a controller 6, and is changed through a servo piston.

The pump control valve 5 controls a tilt angle of the inclined plate of the hydraulic pump 3 such that the product of the discharge pressure PRp (kg/cm$^2$) of the hydraulic pump 3 and the capacity q (cc/rev), of the hydraulic pump 3 is less than a pump absorption torque Tpcom corresponding to the control current pc_epc. This control is referred to as a PC control.

At the generator motor 11, a rotation sensor 14 configured to detect a current real speed GEN_spd (rpm) of the generator motor 11, that is, a real speed of the engine 2 is installed. A signal indicating the real speed GEN_spd detected by the rotation sensor 14 is input to the controller 6.

In addition, at the storage battery 12, a voltage sensor 15 configured to detect a voltage BATT_volt of the storage battery 12 is installed. A signal indicating the voltage BATT_volt detected by the voltage sensor 15 is input to the controller 6.

In addition, the controller 6 outputs the generator motor command value GEN_com to the inverter 13, so that the generator motor 11 performs generation action or electrical motor action. When the controller 6 output the command value GEN_com to the inverter 13 to operate the generator motor 11 as a generator, a portion of an output torque generated at the engine 2 is transmitted to the driving shaft of the generator motor 11 through the output shaft of the engine so as to absorb the torque of the engine 2 and generate electricity. An alternating current power generated from the generator motor 11 is converted into a direct current power at the inverter 13, and then the direct current power is stored in the storage battery 12 through the direct current power line (charge).

When the controller 6 output the command value GEN_com to the inverter 13 to operate the generator motor 11 as an electric motor, the inverter 13 controls the generator motor 11 to function as an electric motor. That is, power is output from the storage battery 12 (discharge), and a direct current stored in the storage battery 12 is converted to an alternating current at the inverter 13, and the current is supplied to the generator motor 11 to rotate the driving shaft of the generator motor 11. Accordingly, the torque is generated from the generator motor 11, and the torque is transmitted to the output shaft of the engine through the driving shaft of the generator motor 11, and is added to the output torque of the engine 2(the output of the engine 2 is assisted). The added output torque is absorbed at the hydraulic pump 3.

A generation amount (absorption torque amount) and an electromotion amount (assist amount; a generated torque amount) of the generator motor 11 are varied according to contents of the generator motor command value GEN_com.

The controller 6 outputs a rotation command value to the engine controller 4 including the governor to increase or decrease a fuel injection amount so as to obtain an target speed according to a current load of the hydraulic pump 3, so that a speed n of the engine 2 and a torque T are adjusted.

Next, a control process performed by the controller 6 will now be described. FIG. 2 is a view illustrating a control flow performed by the controller 6.

An engine target speed set unit 51 has a functional relation 51*a* between a value of the signal 'Throttle' indicated by the throttle valve dial 50 and an engine target speed EngSpdCom corresponding to the value of the signal 'Throttle'. The functional relation 51*a* is memorized at a memory device in the controller 6.

In a relief operation, the discharge pressure PRp of the hydraulic pump 3 is input to an engine maximum speed unit 52. An engine maximum speed EngMaxSpd with respect to the discharge pressure PRp of the hydraulic pump 3 is calculated by the engine maximum speed unit 52. The engine maximum speed EngMaxSpd is used to limit the maximum speed of the engine 2 near the discharge pressure PRp in a relief state. A functional relation of the engine maximum speed EngMaxSpd with respect to the discharge pressure PRp of the hydraulic pump 3 is memorized in the memory device in the controller 6.

A minimum selection unit 53 selects the minimum speed of the engine target speed EngSpdCom output from the engine target speed set unit 51 and the engine maximum speed EngMaxSpd output from the engine maximum speed unit 52 in the relief operation, and outputs the minimum speed as the target speed n_com.

The controller 6 outputs a rotation command value, for setting the engine speed n to the target speed n_com, to the engine controller 4. The engine controller 4 increases or decreases a fuel injection amount to obtain the target speed n_com.

Figure 4:
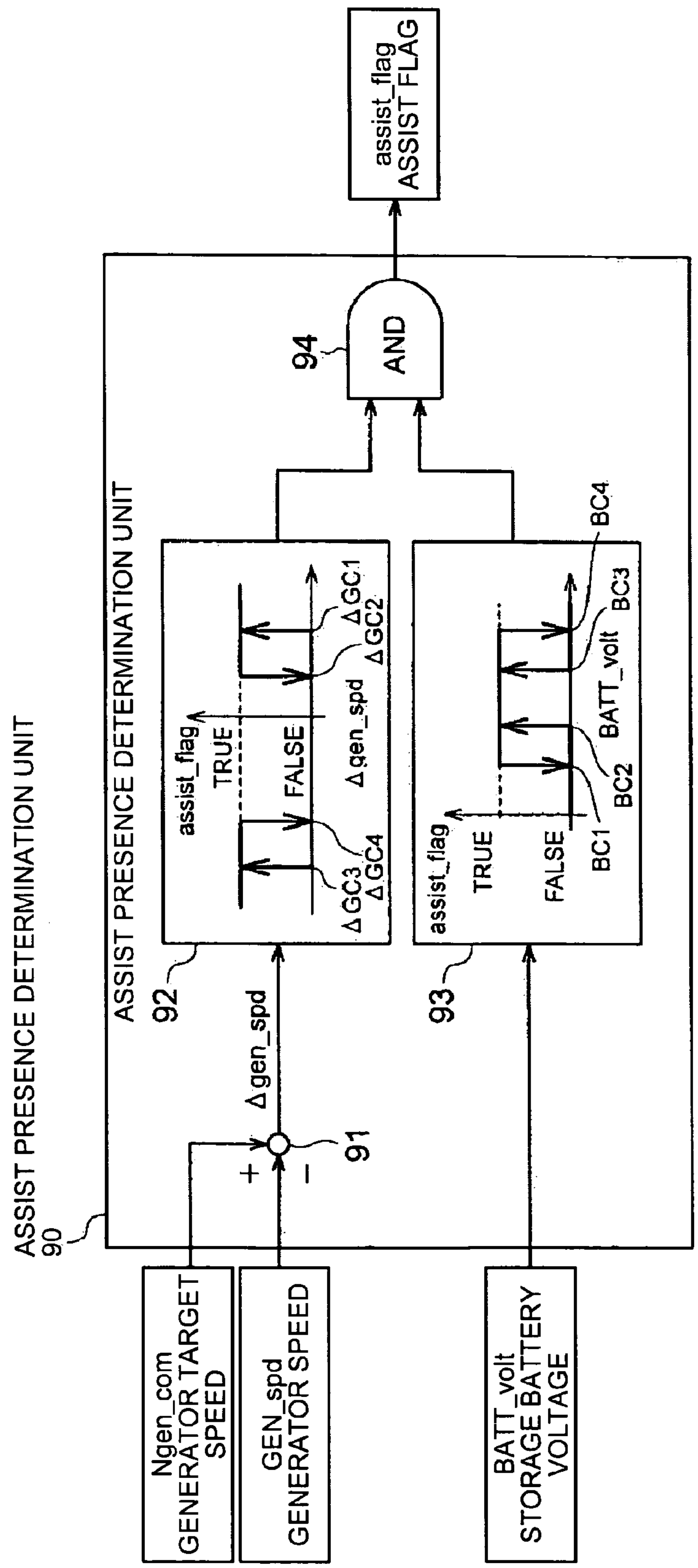
FIG. 4 is a view illustrating a process flow of an assist presence determination unit.

Referring to FIGS. 3 and 4, an assist control process performed by the controller 6 of the construction machine 1 will now be described.

The engine target speed n_com of the engine 2 selected at the minimum selection unit 53 as illustrated in FIG. 2 is input in the assist control process as illustrated in FIG. 3.

In the following description, an engine speed and an engine target speed are respectively converted into a generator motor speed and a generator motor target speed, and then a calculation operation is performed. Alternatively, a generator motor speed and a generator motor target speed may be respectively replaced with an engine speed and an engine target speed, and then a calculation operation is performed in a same manner as that of the above calculation operation.

At a generator motor target speed calculation unit 96, a target speed Ngen_com of the generator motor 11, which corresponds to the current engine target speed is calculated according to an expression described below.

$$Ngen\_com = ncom \times K2 \quad (4)$$

where K2 is the reduction ratio of the PTO shaft 10.

At an assist presence determination unit 90, based on the target speed Ngen_com of the generator motor 11, the current real speed GEN_spd of the generator motor 11 detected at the rotation sensor 14, and the current voltage BATT_volt of the storage battery 12 detected by the voltage sensor 15, it is determined whether the engine 2 is assisted by the generator motor 11 or not (assistance presence).

Referring to FIG. 4, at a deviation calculation unit 91 of the assist presence determination unit 90, a deviation Δgen_spd of the target speed Ngen_com and the real speed GEN_spd of the generator motor 11 is calculated first.

Next, at a first determination unit 92, it is determined that, when the deviation Δgen_spd of the target speed Ngen_com and the real speed GEN_spd of the generator motor 11 is equal to or greater than a first threshold ΔGC1, the generator motor 11 performs electrical motor action, and the assist flag assist_flag is T. It is determined that, when the deviation Δgen_spd of the target speed Ngen_com and the real speed GEN_spd of the generator motor 11 is equal to or less than a second threshold ΔGC2 that is less than the first threshold ΔGC1, the generator motor 11 does not perform electrical motor action (generation action may be performed to store power in the storage battery 12 if necessary), and the assist flag assist_flag is F.

In addition, when the deviation Δgen_spd of the target speed Ngen_com and the real speed GEN_spd of the generator motor 11 is equal to or less than a third threshold ΔGC3, it is determined that the generator motor 11 performs generation action, and the assist flag assist_flag is T. When the deviation Δgen_spd of the target speed Ngen_com and the real speed GEN_spd of the generator motor 11 is equal to or greater than a fourth threshold ΔGC4 that is greater than the third threshold ΔGC3, it is determined that the generator motor 11 does not perform generation action (generation action may be performed to store power in the storage battery 12 if necessary), and the assist flag assist_flag is F.

As such, when the deviation Δgen_spd is plus and increased to be greater than a predetermined value, the generator motor 11 performs electrical motor action to assist the engine 2. Thus, when a current engine speed is different from a target speed, the engine speed is quickly increased toward the engine target speed.

For example, when the hydraulic pump is quickly changed from a high load pressure state to a low load pressure state, until an engine real speed is over a preset value with respect to an engine target speed, the engine speed is controlled such that the engine torque assist action of the generator motor is used to make the engine real speed be the same as the engine target speed. That is, when the hydraulic pump is quickly changed from a high load pressure state to a low load pressure state, a fourth engine target speed is increased, so that a deviation of the fourth engine target speed and a real speed is increased. However, in this case, the engine torque assist action is performed.

In addition, as described above, the fourth engine target speed is increased in response to the case where the hydraulic pump is changed from a high load pressure state to a low load pressure state, and thus, when a real speed of the engine is less than a preset value prior to an engine target speed, until the real speed is increased to be greater than a value less than the preset value prior to the engine target speed, the engine torque assist action of the generator motor is used to control the engine speed to be equal to the target speed.

In addition, when the deviation Δgen_spd is minus and increased to be greater than a predetermined value, the generator motor 11 performs generation action to reversely assist the engine 2. Thus, when an engine speed is decreased, generation action is performed to quickly decrease the engine speed and recycle energy of the engine 2.

A hysteresis is disposed between the first threshold ΔGC1 and the second threshold ΔGC2, and a hysteresis is disposed between the third threshold ΔGC3 and the fourth threshold ΔGC4, thus preventing hunting in control.

At a second determination unit 93, when the voltage BATT_volt of the storage battery 12 is stably disposed in a predetermined range from BC1 to BC4 (BC2 to BC3), the assist flag assist_flag is T, and when the voltage BATT_volt of the storage battery 12 is out of the predetermined range from BC1 to BC4 (BC2 to BC3), the assist flag assist_flag is F.

A first threshold BC1, a second threshold BC2, a third threshold BC3, and a fourth threshold BC4 are set at the voltage BATT_volt in an ascending order of the first threshold BC1, the second threshold BC2, the third threshold BC3, and the fourth threshold BC4.

When the voltage BATT_volt of the storage battery 12 is equal to or less than the third threshold BC3, the assist flag assist_flag is T. When the voltage BATT_volt of the storage battery 12 is equal to or greater than the fourth threshold BC4, the assist flag assist_flag is F. When the voltage BATT_volt of the storage battery 12 is equal to or greater than the second threshold BC2, the assist flag assist_flag is T. When the voltage BATT_volt of the storage battery 12 is equal to or less than the first threshold BC1, the assist flag assist_flag is F.

As such, only when the voltage BATT_volt of the storage battery 12 is stably disposed in the predetermined range from BC1 to BC4 (BC2 to BC3), the assist operation is performed. Accordingly, an assist operation is not performed at a low voltage and a high voltage out of the predetermined range, thus preventing overcharge or full discharge applied to the storage battery 12.

A hysteresis is disposed between the first threshold BC1 and the second threshold BC2, and a hysteresis is disposed between the third threshold BC3 and the fourth threshold BC4, thus preventing hunting in control.

At an AND circuit 94, when the assist flag assist_flag obtained at the first determination unit 92 and the assist flag assist_flag obtained at the second determination unit 93 are simultaneously T, the content of the assist flag assist_flag is finally T, and in the other cases, the content of the assist flag assist_flag is finally F.

At an assist flag determination unit 95, it is determined whether the content of the assist flag assist_flag output from the assist presence determination unit 90 is T or not.

At a generator motor command value switch unit 87, the content of the generator motor command value GEN_com to be provided to the inverter 13 is converted into a target speed or a target torque according to whether the determined result of the assist flag determination unit 95 is T or not (F).

The speed and the torque of the generator motor 11 are controlled through the inverter 13.

In this case, the control of the speed is performed by providing a target speed as the generator motor command value GEN_com to adjust the speed of the generator motor 11 and obtain the target speed. The control of the torque is performed by providing a target torque as the generator motor command value GEN_com to adjust the torque of the generator motor 11 and obtain the target torque.

At a modulation process unit 97, a target speed of the generator motor 11 is calculated and output. In addition, at a generator motor torque calculation unit 68, a target torque of the generator motor 11 is calculated and output.

That is, with respect to the target speed Ngen_com obtained at the generator motor target speed calculation unit 96, the modulation process unit 97 outputs the speed Ngen_com on which a modulation process is performed according to a characteristic 97*a*. Instead of outputting the target speed Ngen_com input from the generator motor target speed calculation unit 96 as it is, the target speed Ngen_com input from the generator motor target speed calculation unit 96 is slowly increased over a time t.

Comparing with a case where the modulation process is not performed, the effect of a case where the modulation process is performed will now be described with reference to torque graphs as illustrated in FIGS. 5 through 8.

Figure 5:
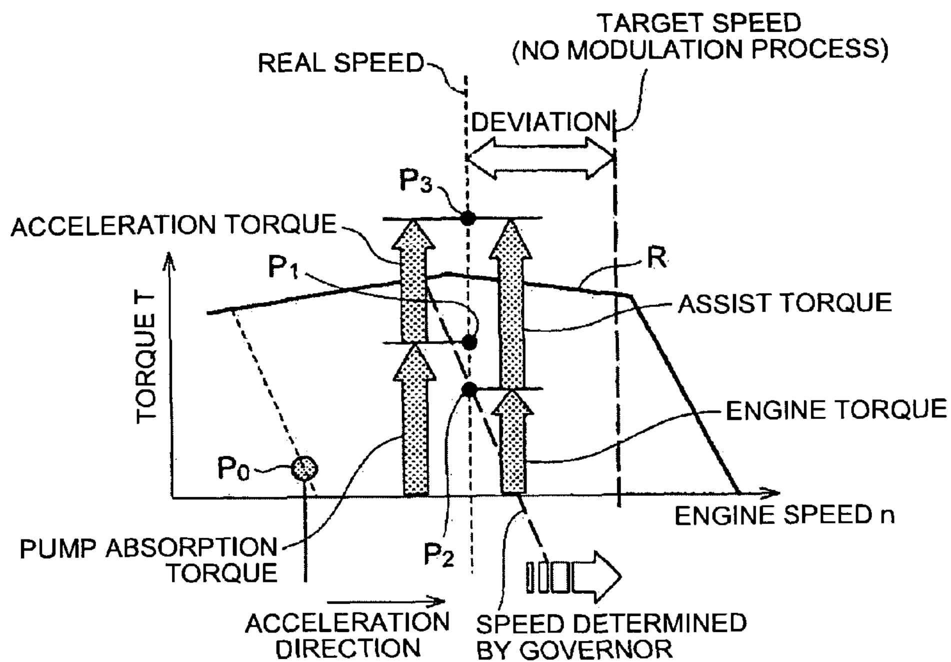
FIG. 5 is a view illustrating a movement in case where a modulation process is not performed when an engine is accelerated.
Figure 6:
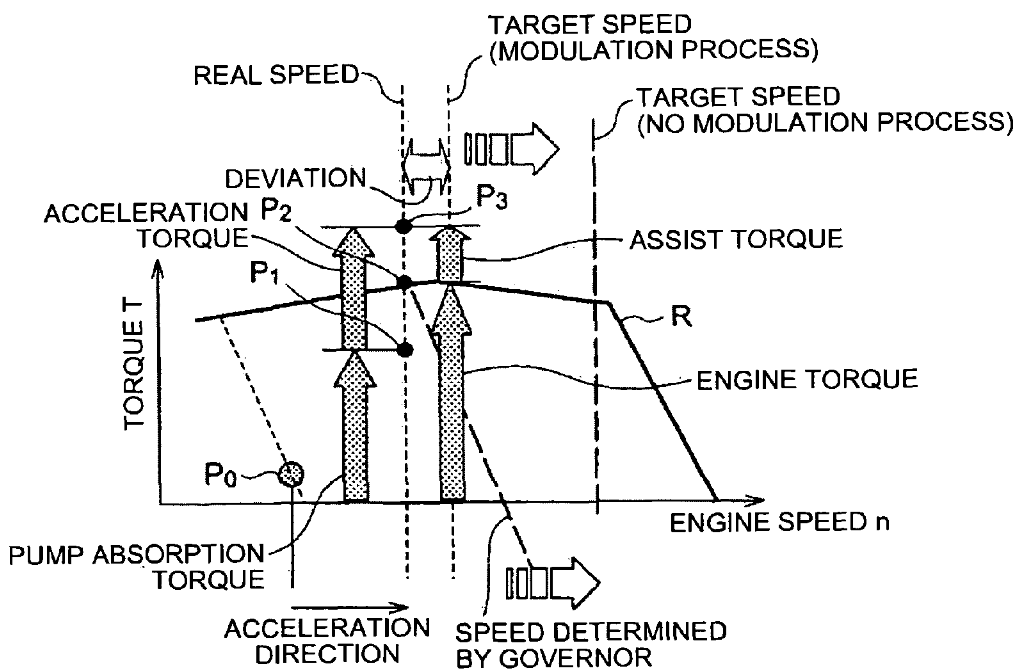
FIG. 6 is a view illustrating a movement in case where a modulation process is performed when an engine is accelerated.
Figure 7:
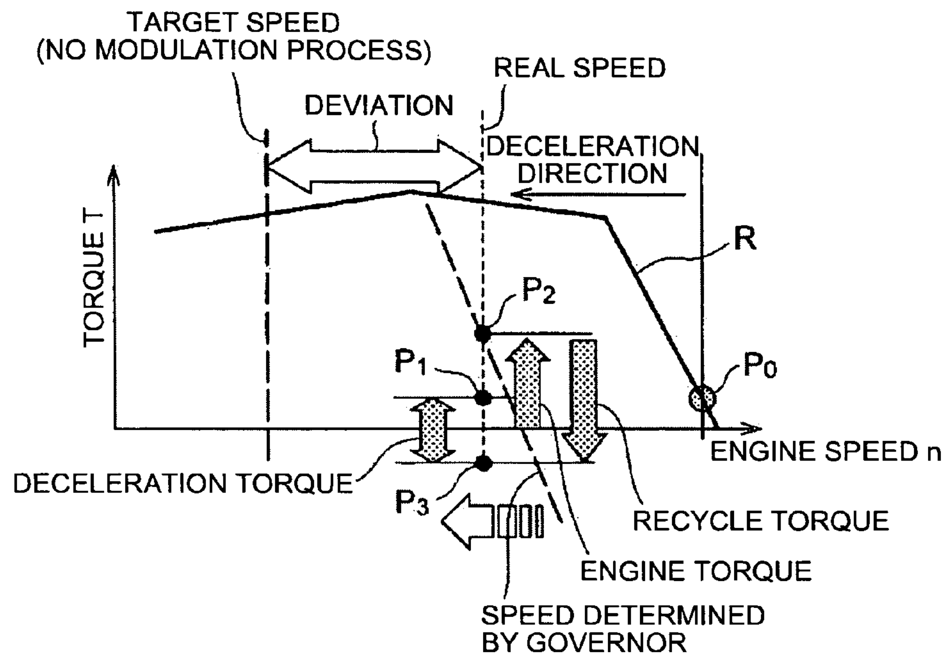
FIG. 7 is a view illustrating a movement in case where a modulation process is not performed when an engine is decelerated.
Figure 8:
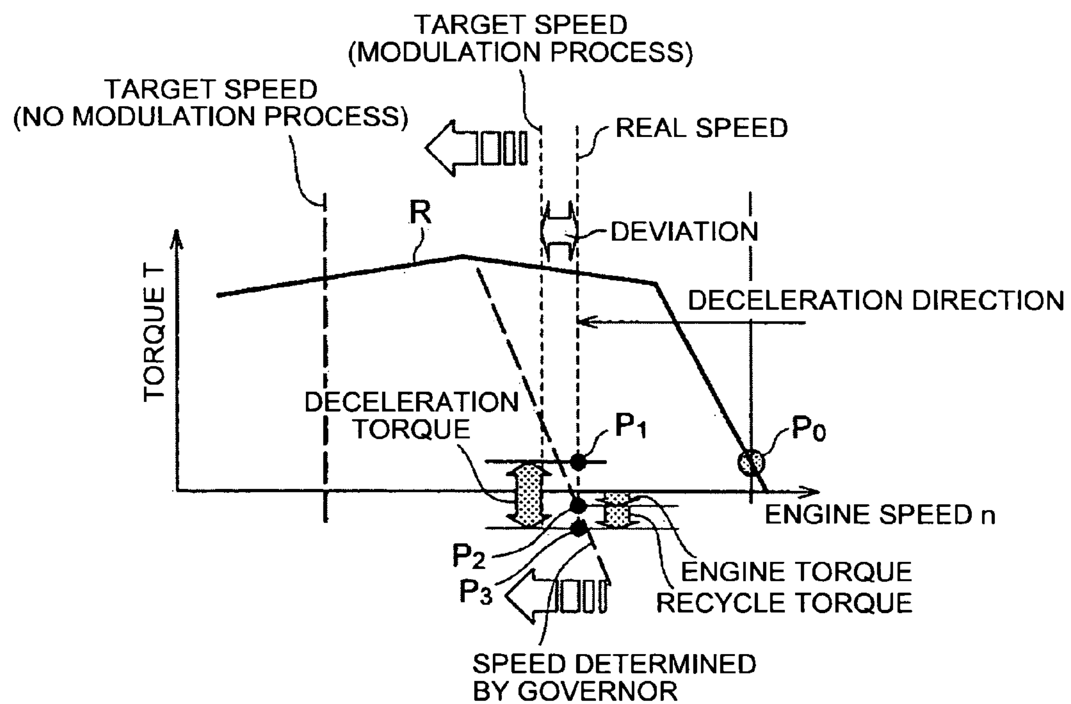
FIG. 8 is a view illustrating a movement in case where a modulation process is performed when an engine is decelerated.
Figure 10:
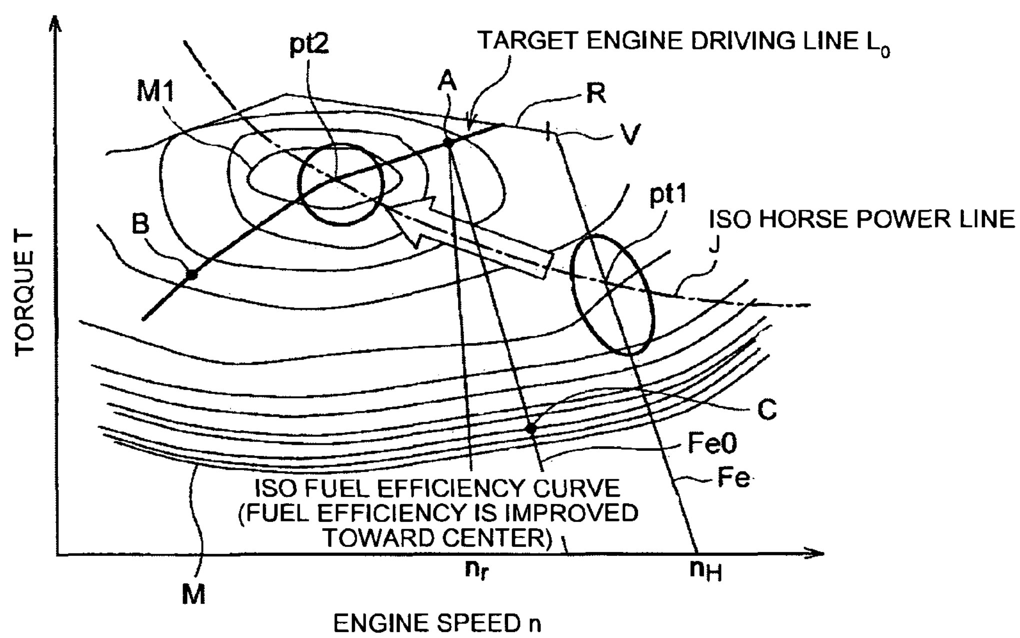
FIG. 10 illustrates a torque graph in the related art.

FIG. 5 is a view illustrating a movement of a governor in case where the modulation process is not performed when an engine is accelerated. FIG. 6 is a view illustrating a movement of a governor in case where the modulation process is performed when an engine is accelerated. FIG. 7 is a view illustrating a movement of a governor in case where the modulation process is not performed when an engine is decelerated. FIG. 8 is a view illustrating a movement of a governor in case where the modulation process is performed when an engine is decelerated. When a mechanism governor is used as a governor, a speed determined by the governor may be less than a real engine speed.

Referring to FIGS. 5 and 6, when a load of the hydraulic pump 3 is great, the engine 2 is accelerated from a low rotation matching point P0 to a high rotation side. In FIGS. 5 and 6, P2 corresponds to an engine torque. The sum of an assist portion and the engine torque is a total torque P3 of the engine 2 and the generator motor 11. P1 corresponds to a pump absorption torque, and the sum of the pump absorption torque and an acceleration torque corresponds to the total torque P3.

Referring to FIG. 5, when the modulation process is not performed, an assist torque corresponding to a deviation of an engine target speed and an engine real speed is generated. When the deviation is great, corresponding to the great deviation, the assist torque is increased by the generator motor 11. Thus, the engine 2 is accelerated more rapidly than the governor is, so that a real speed is greater than a speed determined by the governor. When the engine 2 is rapidly accelerated, a fuel injection amount is decreased by operating the governor so as to decrease an engine torque. Accordingly, although the engine 2 is assisted by the generator motor 11, the engine 2 is in a friction state, so that the acceleration of the engine 2 is not increased. Thus, while a fuel injection amount and an engine torque are decreased, the engine 2 is in a loss state, and the engine 2 is accelerated, thus losing energy, and the engine 2 is not sufficiently accelerated.

Referring to FIG. 6, when the modulation process is performed, the modulation process is performed on an engine target speed, and a deviation of the engine target speed and the engine real speed is decreased, and thus, a small assist torque is generated at the generator motor 11. Accordingly, the movement of the governor follows the acceleration of the engine, and the speed determined by the governor is equal to the real speed. Thus, energy loss is reduced to sufficiently accelerate the engine 2.

Next, a case where the engine 2 is decelerated will now be described. Referring to FIGS. 7 and 8, when a load of the hydraulic pump 3 is great, the engine 2 is decelerated from a high rotation matching point P0 to a low rotation side.

In FIGS. 7 and 8, P2 corresponds to an engine torque. The sum of a recycle torque and the engine torque is a total torque P3 of the assist 2 and the generator motor 11. P1 corresponds to a pump absorption torque, and the sum of the pump absorption torque and a deceleration torque corresponds to the total torque P3.

Referring to FIG. 7, when the modulation process is not performed, a recycle torque corresponding to a deviation of an engine target speed and an engine real speed is generated. When the deviation is great, corresponding to the great deviation, the recycle torque is increased by the generator motor 11. Thus, the engine 2 is decelerated more rapidly than the governor is, so that a real speed is less than a speed determined by the governor. When the engine 2 is rapidly decelerated, a fuel injection amount is increased by operating the governor so as to increase an engine torque. Accordingly, the engine 2 increases torque, and electricity is generated at the generator motor 11 so as to decelerate the engine 2. As a result, the engine 2 increase torque, and increased engine energy is recycled by the generator motor 11, so that the engine 2 is decelerated, thus generating useless electricity and wasting energy.

Referring to FIG. 8, when the modulation process is performed, the modulation process is performed on an engine target speed, and a deviation of the engine target speed and the engine real speed is decreased, and thus, a small recycle torque is generated at the generator motor 11. Accordingly, the governor follows a deceleration of the engine 2, and the speed determined by the governor is equal to the real speed. Thus, the torque of the engine 2 is minus, and velocity energy of the engine 2 is recycled by the generator motor 11, so that the engine 2 is decelerated, thus preventing energy loss and decelerating the engine 2 with improved efficiency.

At the generator motor torque calculation unit 68, a target torque Tgen_com corresponding to the current voltage BATT_volt is calculated based on the current voltage BATT_volt of the storage battery 12 detected at the voltage sensor 15.

At the memory device, a functional relation 68*a* having a hysteresis that the target torque Tgen_com is decreased according to the increase 68*b* of the voltage BATT_volt of the storage battery 12 and the target torque Tgen_com is increased according to the decrease 68*c* of the voltage BATT_volt of the storage battery 12 is memorized in a data table manner. The functional relation 68*a* adjusts a generation amount of the generator motor 11, and is set to maintain a voltage value of the storage battery 12 in a predetermined range.

At the generator motor torque calculation unit 68, the target torque Tgen_com corresponding to the current voltage BATT_volt of the storage battery 12 is output according to the functional relation 68*a*.

At the assist flag determination unit 95, when the content of the assist flag assit_flag is T, the generator motor command value switch unit 87 is switched to the modulation process unit 97, and the target speed Ngen_com output at the modulation process unit 97 as the generator motor command value GEN_com is output to the inverter 13 to control the speed of the generator motor 11, and the generator motor 11 performs generation action or electrical motor action.

In addition, at the assist flag determination unit 95, when the content of the assist flag assit_flag is F, the generator motor command value switch unit 87 is switched to the generator motor torque calculation unit 68, and the target torque Tgen_com output at the generator motor torque calculation unit 68 as the generator motor command value GEN_com is output to the inverter 13 to control the torque of the generator motor 11, and the generator motor 11 performs generation action.

At a pump absorption torque command value switch unit 88, according to whether a determined result of the assist flag determination unit 95 is T is or not (F), a content of a pump target absorption torque T provided to a control current calculation unit 67 is switched to a first pump target absorption torque Tp_com1 or a second pump target absorption torque Tp_com2.

The first pump target absorption torque Tp_com1 is calculated at a first pump target absorption torque calculation unit 66 (the same configuration of a first pump target absorption torque calculation unit 66 as illustrated in FIG. 2).

That is, the first pump target absorption torque Tp_com1 is provided as a torque value on a first target torque line L1 in a torque graph of FIG. 11. The first target torque line L1 is set as an target torque line where the target absorption torque Tp_com1 of the hydraulic pump 3 is decreased as the engine target speed n is decreased.

The second pump target absorption torque Tp_com2 is calculated at a second pump target absorption torque calculation unit 85. That is, the second pump target absorption torque Tp_com2 is provided as a torque value on a second target torque line L12 where a pump target absorption torque is increased in a low rotation region with respect to the first target torque line L1 in the torque graph of FIG. 11.

At the first pump target absorption torque calculation unit 66, the first pump target absorption torque Tp_com1 of the hydraulic pump 3 corresponding to the engine target speed ncom is calculated.

At the memory device, a functional relation 66*a* in which the first pump target absorption torque Tp_com1 of the hydraulic pump 3 is increased according to the increase of the engine target speed ncom is memorized in a data table manner. The function 66*a* is a curve corresponding to a first target torque line L1 on a torque graph of FIG. 19.

FIG. 19 illustrates a torque graph of the engine 2 with a horizontal axis being an engine speed n (rpm; rev/min) and a vertical axis being torque T (N·m). The function 66*a* corresponds to the target torque line L1 on the torque graph of FIG. 9.

At the first pump target absorption torque calculation unit 66, the first pump target absorption torque Tp_com1 corresponding to the current engine target speed ncom is calculated according to the functional relation 66*a*.

At the second pump target absorption torque calculation unit 85, the second pump target absorption torque Tp_com2 of the hydraulic pump 3 corresponding to the real speed GEN_spd of the generator motor 11 is calculated.

At the memory device, a functional relation 85*a* in which the second pump target absorption torque Tp_com2 of the hydraulic pump 3 is varied according to the real speed GEN_spd of the generator motor 11 is memorized in a data table manner. The function 85*a* is a curve corresponding to the second target torque line L12 on the torque graph of FIG. 9, and has a characteristic in which a pump target absorption torque is increased in a low rotation region with respect to the first target torque line L1. For example, the second target torque line L12 is a curve corresponding to an iso horsepower line, and adopts a characteristic in which a torque is decreased according to the increase of an engine speed.

At the second pump target absorption torque calculation unit 85, the second pump target absorption torque Tp_com2 corresponding to the current real speed GEN_spd of the generator motor 11 is calculated according to the functional relation 85*a*.

At the assist flag determination unit 95, when the content of the assist flag assit_flag is T, the pump absorption torque command value switch unit 88 is switched to the second pump target absorption torque calculation unit 85, and the second pump target absorption torque Tp_com2 output at the second pump target absorption torque calculation unit 85 is output as a pump target absorption torque Tp_com to a filter process unit 89 at the rear end.

In addition, at the assist flag determination unit 95, when the content of the assist flag assit_flag is F, the pump absorption torque command value switch unit 88 is switched to the first pump target absorption torque calculation unit 66, and the first pump target absorption torque Tp_com1 output at the first pump target absorption torque calculation unit 66 is output as the pump target absorption torque Tp_com to the filter process unit 89 at the rear end.

As described above, at the pump absorption torque command value switch unit 88, the target absorption torques Tp_com1 and Tp_com2 of the hydraulic pump 3, that is, the target torque lines L1 and L12 of FIG. 9 are selectively switched.

At the filter process unit 89, when the target torque lines L1 and L12 are selectively switched, a filter process is performed to achieve slow switching from the pump target absorption torque (the second pump target absorption torque Tp_com2) on the target torque line (for example, the second target torque line L12) before the switching to the pump target absorption torque (the second pump target absorption torque Tp_com1) on the target torque line (the first target torque line L1) after the switching.

That is, when the target torque lines L1 and L12 are selectively switched, the filter process unit 89 outputs the target torque value Tp_com, on which the filter process is performed, according to a characteristic 89*a*. When the target torque lines L1 and L12 are selectively switched, instead of directly performing an output operation according to the switching from the pump target absorption torque (the second pump target absorption torque Tp_com2) on the target torque line (for example, the second target torque line L12) to the pump target absorption torque (the second pump target absorption torque Tp_com1) on the target torque line (the first target torque line L1), the switching is smoothly performed over the time t from the pump target absorption torque (the second pump target absorption torque Tp_com2) on the target torque line (the second target torque line L12) to the pump target absorption torque (the second pump target absorption torque Tp_com1) on the target torque line (the first target torque line L1).

Referring to FIG. 9, the switching is slowly performed over time from the second pump target absorption torque Tp_com2 at a point G on the second target torque line L12 to the first pump target absorption torque Tp_com2 at a point H on the first target torque line L1.

Accordingly, shock of an operator or a body due to a quick torque variation is controlled, and discomfort in operation sense is removed.

The filter process may be performed when a determined result of the assist flag determination unit 95 is switched both from T to F and from F to T. Alternatively, the filter process may be performed when a determined result of the assist flag determination unit 95 is switched one of both from T to F and from F to T. Particularly, in the case where a determined result of the assist flag determination unit 95 is switched from T to F and the switching is performed from the second target torque line L12 to the first target torque line L1, when the filter process is not performed, torque is quickly decreased and discomfort in operation sense is increased. Thus, when a determined result is switched from T to F and the switching is performed from the second target torque line L12 to the first target torque line L1, the filter process may be performed.

The pump target absorption torque Tp_com output from the filter process unit 89 is provided to the control current calculation unit 67. At the control current calculation unit 67, a control current pc_epc corresponding to the pump target absorption torque Tp_com is calculated.

At the memory device, a functional relation 67*a* in which the control current pc_epc is increased according to the increase of the pump target absorption torque Tp_com is memorized in a data table manner.

At the control current calculation unit 67, the control current pc_epc corresponding to the current pump target absorption torque Tp_com is calculated according to the functional relation 67*a*.

The control current pc_epc is output from the controller 6 to the pump control valve 5 to adjust the pump control valve 5 through a servo piston. The pump control valve 5 PC-controls the tilt angle of the inclined plate of the hydraulic pump 3 such that the product of the discharge pressure PRp ($kg/cm^2$) of the hydraulic pump 3 and the capacity q (cc/rev) of the hydraulic pump 3 is not greater than the pump target absorption torque Tp_com corresponding to the control current pc_epc.

According to the current embodiment, the control process of decreasing the engine speed is performed in the relief state, instead of limiting pump absorption torque. In this case, the same output as an output obtained by limiting a pump absorption torque can be obtained while the engine speed is decreased. Thus, engine efficiency is improved without decreasing pump efficiency, thereby saving energy and reducing noises.

Particularly, since an engine speed is decreased in the relief operation at a high load pressure state, the deviation between an engine target speed and a real engine speed is increased, and just after the relief operation, the engine target speed is increased, but the real engine speed is decreased, and it takes time for the real engine speed to move to the engine target speed. In the current embodiment, when this large deviation occurs, the assist control is performed. Thus, the real engine speed is rapidly returned to the engine target speed, thus performing a work without feeling work amount reduction.

In addition, the current embodiment may be applied to a construction machine provided with an electric swing system configured to rotate the upper swing body of the construction machine through electric actuator.

The invention claimed is:

1. An engine control apparatus comprising; a hydraulic pump driven by an engine;

a hydraulic actuator to which pressure oil discharged from the hydraulic pump Is supplied;

an operation unit configured to operate the hydraulic actuator;

a first target speed set unit configured to set a first target speed of the engine by an engine target speed set dial;

a second target speed calculation unit configured to calculate a second target speed limiting a maximum target speed of the engine on a relief state according to increase of a load pressure of the hydraulic pump; and a speed control unit configured to control an engine speed such that the engine speed Is equal to the lower one of the first target speed and the second target speed.

2. The engine control apparatus according to claim 1, further comprising;

a generator motor connected to an output shaft of the engine;

a storage battery configured to store electric power which the generator motor generates, and to supply electric power to the generator motor; and a control unit, wherein when the load pressure of the hydraulic pump is abruptly switched from a high state to a low state, until a real speed of the engine is increased to be equal to or greater than a value preset with respect to the target speed, the control unit uses an engine torque assist action of the generator motor to control the engine speed to be equal to the target speed.

3. The engine control apparatus according to claim 1, further comprising:

a generator motor connected to an output shaft of the engine;

a storage battery configured to store electric power the generator motor generates, and to supply electric power to the generator motor; and a control unit, wherein by increase of the second target speed according to a case where the load pressure of the hydraulic pump is decreased from a high state to a low state, when a real speed of the engine is less than a preset value and the target speed, until the real speed is increased to be equal to or greater than a value less than the preset value and the target speed, the control unit uses an engine torque assist action of the generator motor to control the engine speed to be equal to the target speed.

* * * * *